(12) United States Patent
Fischer

(10) Patent No.: US 7,475,761 B2
(45) Date of Patent: Jan. 13, 2009

(54) APPARATUS FOR VIBRATION DAMPING IN A MOTOR VEHICLE

(75) Inventor: Jochem Fischer, Ostfildern (DE)

(73) Assignee: Benteler Automobiltechnik GmbH, Paderborn (DE)

( * ) Notice: Subject to any disclaimer, the term of this patent is extended or adjusted under 35 U.S.C. 154(b) by 392 days.

(21) Appl. No.: 11/136,053

(22) Filed: May 24, 2005

(65) Prior Publication Data

US 2005/0284713 A1 Dec. 29, 2005

(30) Foreign Application Priority Data

Jun. 25, 2004 (DE) .................. 10 2004 030 935

(51) Int. Cl.
*F16F 9/32* (2006.01)
(52) U.S. Cl. ................ 188/266.7; 188/378; 267/136
(58) Field of Classification Search ............. 188/378, 188/266.7; 267/136
See application file for complete search history.

(56) References Cited

U.S. PATENT DOCUMENTS 5,734,246 A * 3/1998 Falangas .................. 318/649

FOREIGN PATENT DOCUMENTS

| DE | 39 39 822 A1 | 6/1991 |
|---|---|---|
| DE | 197 12 292 A1 | 10/1998 |
| DE | 198 20 617 C2 | 11/1999 |
| DE | 199 23 704 A1 | 11/2000 |
| EP | 0 720 144 A1 | 7/1996 |
| JP | 10282966 A * | 10/1998 |
| WO | WO 03106246 A1 * | 12/2003 |

* cited by examiner

*Primary Examiner*—Bradley T King
(74) *Attorney, Agent, or Firm*—Henry M. Feiereisen; Ursula B. Day

(57) ABSTRACT

Apparatus for damping vibration in a motor vehicle includes a vibration damper module having a hollow-cylindrical housing, which has opposite ends closed by force-transmitting end closures, and a control unit for detecting interfering vibration and generating a control signal in response to the detection of the interfering vibration. An actuator assembly is secured to an inside wall surface of the housing and rendered operative in response to the generation of the control signal for causing the vibration damper module to introduce into the motor vehicle a counter vibration to suppress the interfering vibration. The actuator assembly includes at least three actuators distributed in the housing in spaced-apart relationship on a pitch circle and having a length extension which is aligned in parallel relationship to a length extension of the housing.

8 Claims, 1 Drawing Sheet

APPARATUS FOR VIBRATION DAMPING IN A MOTOR VEHICLE

CROSS-REFERENCES TO RELATED APPLICATIONS

This application claims the priority of German Patent Application, Serial No. 10 2004 030 935.3, filed Jun. 25, 2004, pursuant to 35 U.S.C. 119(a)-(d), the subject matter of which is incorporated herein by reference.

BACKGROUND OF THE INVENTION

The present invention relates to an apparatus for vibration damping in a motor vehicle.

Nothing in the following discussion of the state of the art is to be construed as an admission of prior art.

German patent application no. DE 39 39 822 A1, published Jun. 6, 1991, discloses a vibration damping system for a motor vehicle, having a control unit for detecting interfering vibration and for controlling an adjuster for operating a vehicle-mounted oscillator in response to the detection of the interfering vibration. The oscillator introduces into the motor vehicle a superimposing and damping, phase-shifted counter vibration in opposition to the interfering vibration. The oscillator is formed by a functional element of the vehicle, e.g. battery or radiator, and the adjuster is realized in the form of a piezo ceramic actuator.

German Pat. No. DE 198 20 617 C2 describes an active vibration damper for motor vehicles which includes struts that are length adjustable on the vehicle underside. The struts are split in midsection and nested within one another like sleeves. Piezoelectric actuators implement a length control of the struts to produce compensating vibration.

European patent application no. EP 0 720 144 A1 describes a system for reducing noise due to vibration in vehicles. Sensors ascertain the motor speed and transmit commensurate information to a control device which includes an amplifier and control several piezoelectric actuators. The piezoelectric actuators are arranged on a body component of the vehicle and secured by gluing.

German patent application no. DE 197 12 292 A1, published Oct. 1, 1998, describes a flange unit for active suppression of vibration. The flange unit is arranged between a vibration generator and a rigid structure and has two flanges, between which an actively controllable pressure-generating element, at least two fiber composite loops, and a tube are arranged. Counter vibrations are generated by elongation and contraction of the pressure-generating element.

German patent application no. DE 199 23 704 A1, published Nov. 23, 2000, describes a vibration damping arrangement having length-adjustable struts which are mounted diagonally across the underside of a body floor. Piezoelectric elements are provided to effect the length adjustments and have incrementally alternating sensor and actuator functions.

It would be desirable and advantageous to provide an improved vibration damping apparatus which is compact in construction and exhibits superior vibration damping properties for incorporation in vibration-causing components of a motor vehicle.

SUMMARY OF THE INVENTION

According to one aspect of the present invention, an apparatus for damping vibration in a motor vehicle includes a control unit for detecting interfering vibration and generating a control signal in response to the detection of the interfering vibration, a vibration damper module arranged in a motor vehicle and including a hollow-cylindrical housing which has opposite ends, and end closures constructed for transmitting a force and respectively secured to the ends of the housing for closing the ends of the housing, and an actuator assembly secured to an inside wall surface of the housing of the vibration damper module and rendered operative in response to the generation of the control signal for causing the vibration damper module to introduce into the motor vehicle a counter vibration to suppress the interfering vibration, wherein the actuator assembly includes at least three actuators distributed in the housing in spaced-apart relationship on a pitch circle and having a length extension aligned in parallel relationship to a length extension of the housing.

The present invention resolves prior art problems by providing at least three actuators which are disposed in the housing in spaced-apart relationship on a pitch circle, whereby the length extension of the actuators is parallel to the length extension of the housing. As a result of this configuration, bending vibrations are compensated especially effective. As the actuators are secured on the inside of the housing, the distance to the neutral fiber of the housing is small in the event of a bending so that a bending vibration can be suppressed through force introduction via the actuators. The end closures can be glued or welded to the inside wall surface of the housing and may also assume the function of force transmission.

As a consequence, the vibration damper module is compact and their integration into the vibration-causing vehicle components, e.g. in the main tube a dashboard support or in a column of the vehicle body, can be tailored to the situation at hand. The vibration damper module thus forms an integral part of the vehicle component so as to be able to effectively compensate any bending vibrations encountered there.

Any vibration encountered during travel is detected by sensors and suppressed by a compensating vibration generated by the control device in the vibration damper module and transmitted onto the vehicle component that is linked to the vibration damper module. The compensating vibration attenuates the interfering vibration to neutralize it completely or at least shift the interfering vibration to a frequency range that has no adverse effect or is not perceived.

According to another feature of the present invention, the actuators may each be constructed in the form of a piezoelectric element. Suitably, the actuators can be constructed in the form of piezo ceramic stack actuators.

Piezoelectric elements convert electric energy to mechanical energy in the absence of moving parts. As a result, they are able to respond very quickly and have a long service life. The piezoelectric effect is based on a mechanical deformity of certain embedded crystals under the influence of an electric field. This effect is used to realize an active excitation of the piezoelectric elements via an external control device and the generation of a counter or compensating vibration by inducing a tension into the housing of the vibration damper module.

Although the use of piezoelectric actuators is currently preferred, the use of hydraulic or pneumatic small capacity cylinders as well as electro-dynamic actuators is, of course, also conceivable. Also, a combination of piezo elements with extra-small capacity cylinders, operating in concert as actuators, may be conceivable. A tension is induced via the actuators into the vibration damper module which thus is caused to vibrate. Interfering vibrations, as generated by the chassis, engine or the like, are hereby superimposed and compensated.

According to another feature of the present invention, the vibration damper module may have mounting flanges for securement of the vibration damper module between vehicle components. The mounting flanges are suitably designed to suit the installation site of the vibration damper module and thus the vehicle components at hand. For example, the vibration damper module may be integrated in vehicle components, such as the main tube of the dashboard support (instrument panel structure) or other components of the vehicle body.

According to another feature of the present invention, the actuators, arranged in the housing of the vibration damper module, are supplied with electric energy from an external power source via supply lines routed via the housing to the actuators.

BRIEF DESCRIPTION OF THE DRAWING

Other features and advantages of the present invention will be more readily apparent upon reading the following description of currently preferred exemplified embodiments of the invention with reference to the accompanying drawing, in which.

DETAILED DESCRIPTION OF PREFERRED EMBODIMENTS

Figure 1:
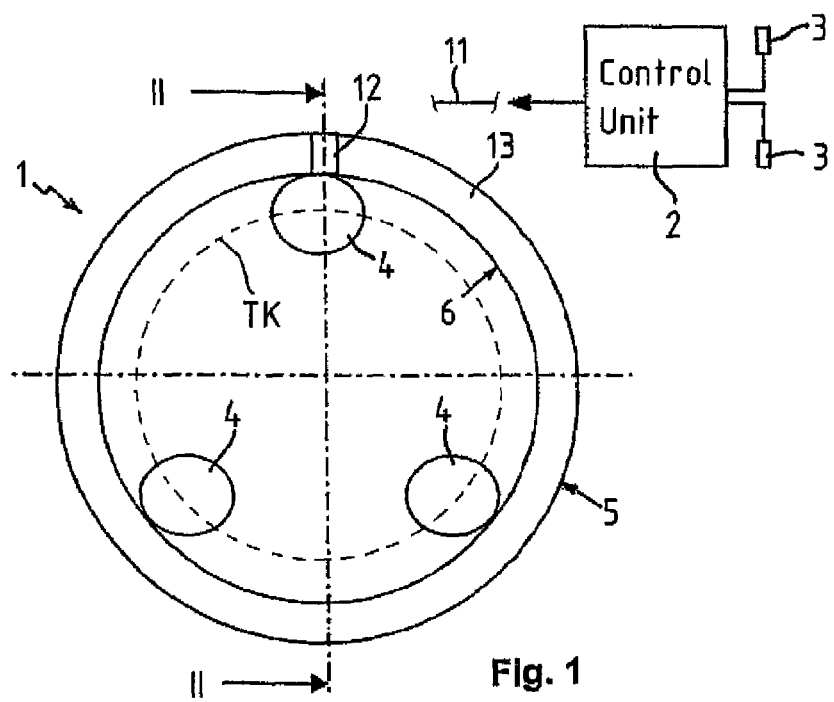
FIG. 1 is a simplified illustration of a vibration damper module of a vibration damping apparatus according to the present invention for installation in a motor vehicle.

Throughout all the Figures, same or corresponding elements are generally indicated by same reference numerals. The depicted embodiment is to be understood as illustrative of the invention and not as limiting in any way. It should also be understood that the drawings are not necessarily to scale and that the embodiments are sometimes illustrated by graphic symbols, phantom lines, diagrammatic representations and fragmentary views. In certain instances, details which are not necessary for an understanding of the present invention or which render other details difficult to perceive may have been omitted.

Turning now to the drawing, and in particular to FIG. 1, there is shown a simplified illustration of a vibration damper module, generally designated by reference numeral 1 and forming part of a vibration damping apparatus according to the present invention intended for installation in an unillustrated motor vehicle and further including a control unit 2 and sensors 3 which are operatively connected to the control unit 2. The vibration damper module 1 has a hollow-cylindrical housing 5 and at least three actuators 4 which are integrated in the housing 5 and secured, e.g. by gluing or welding, to an inside wall surface 6 of the housing 5 in spaced-apart relationship about a pitch circle TK.

During travel of the vehicle, the sensors 13 detect vehicle vibration caused, e.g., by the roadway, tires, or engine and the like. In response to detection of such interfering vibration, the sensors 3 generate respective signals which are transmitted to the control unit 2. In response to the received signals from the sensors 3, the control unit 2 activates the actuators 4 to induce tensions in the housing 5 of the vibration damper module 1. As a result, the vibration damper module 1 introduces into the vehicle phase-shifted a counter vibration which superimposes the interfering vibration and dampens it.

Currently preferred is the construction of the actuators 4 in the form of piezoelectric elements which are securely fixed to the inside wall surface 6 of the housing 5.

Figure 2:
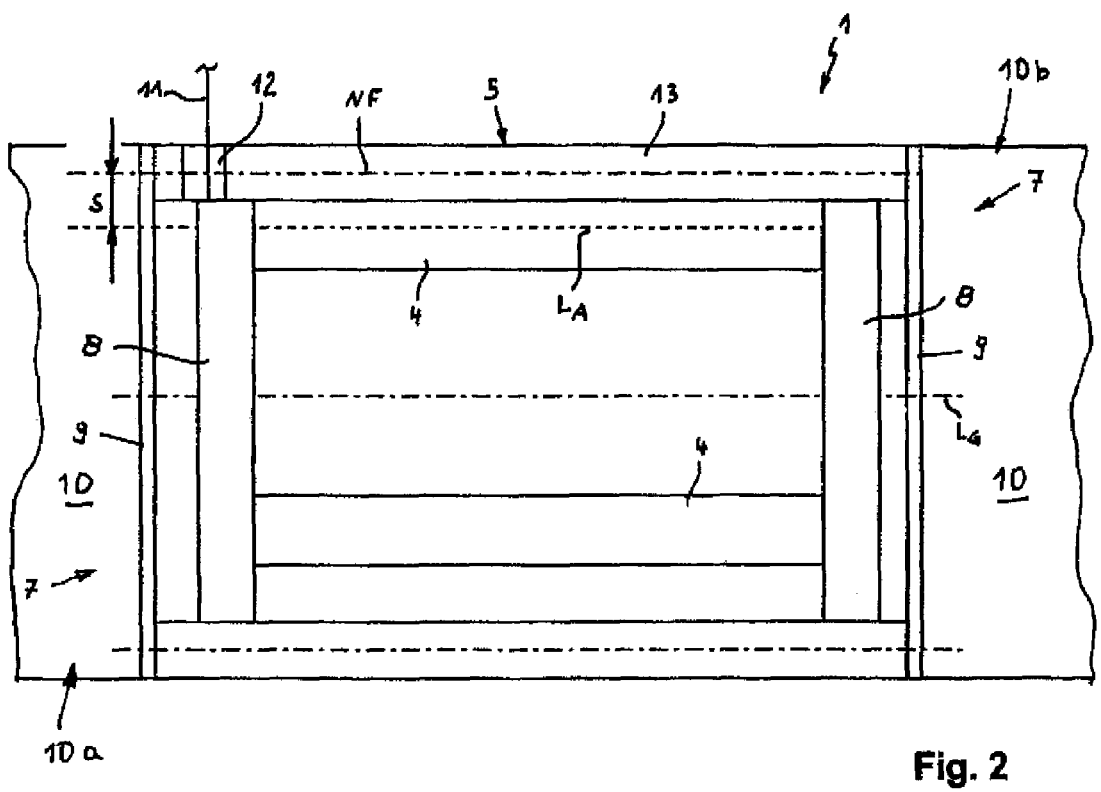
FIG. 2 is a sectional view of the vibration damper module, taken along the line II-II in FIG. 1.

As shown in FIG. 1, the actuators 4 are provided staggered in circumferential direction in the housing 5 on a pitch circle TK. The actuators 4 have a length extension $L_A$ which is oriented parallel to a length extension $L_G$ of the housing 5. This is shown in FIG. 2 which is a sectional view of the vibration damper module 1, taken along the line II-II in FIG. 1. Both ends faces 7 of the housing 5 are sealed by force-transmitting end closures 8. The housing 5 is further provided with mounting flanges 9 for coupling the vibration damper module 1 between vehicle components.

As a result of its configuration, the vibration damper module 1 can be integrated, for example, in a main tube 10 of a dashboard support which carries the instrument panel. The vibration damper module 1, which is small in size and very compact, can be connected, e.g. welded, to both tube portions 10a, 10b of the main tube 10. The actuators 4, which are integrated in the vibration damper module 1, are supplied with voltage from an unillustrated external power source, whereby supply lines 11 are routed from the power source via openings 12 of the housing 5 of the vibration damper module 1 into the housing interior and ultimately to the actuators 4.

During travel, the sensors 3 detect and measure encountered vibration. In response to detected data, the sensors 3 generate respective signals which are transmitted to the control unit 2 for evaluation and analysis. In response to the ascertained vibration, the control unit 2 sends respective signals to the actuators 4 for activation. By changing the shape or volume or by weight shift within the actuators 4, tension is induced into the housing 5 for stimulating the vibration damper module 1 and thereby causes the vibration damper module 1 to produce a direction-controlled compensating counter vibration so that the interfering vibration generated during travel is superimposed and neutralized. When constructing the actuators 4 in the form of piezoelectric elements, a control of the electric voltage results in a change in shape and/or thickness of the piezoelectric elements to thereby allow a targeted vibration control.

As stated above, it is currently preferred to secure the actuators 4 upon the inner wall surface 6 of the housing 5 of the vibration damper module 1. As a result, there is only a short spacing s between the actuators 4 and the neutral fiber NF lying in the housing wall 13. Bending vibrations in the vehicle component, i.e. the main tube 10 of the dashboard support for example, can be suppressed especially effectively because forces can be introduced via the actuators 4 in proximity of the neutral fiber NF. In addition, the vehicle component can be stiffened by the force action of the actuators 4 and the applied mechanical tension.

By integrating in a vehicle component a vibration damper module 1 according to the present invention, an effective damping of unwanted vibration can be realized in the actual vibration-causing component. In this way, unwanted vibration can be effectively damped. The unwanted vibration is neutralized or shifted to a frequency range that has no adverse effect and is not perceived during travel.

While the invention has been illustrated and described in connection with currently preferred embodiments shown and described in detail, it is not intended to be limited to the details shown since various modifications and structural changes may be made without departing in any way from the spirit of the present invention. The embodiments were chosen and described in order to best explain the principles of the invention and practical application to thereby enable a person skilled in the art to best utilize the invention and various embodiments with various modifications as are suited to the particular use contemplated.

What is claimed is:

1. Apparatus for damping vibration in a motor vehicle; comprising:
 a control unit for detecting interfering vibration and generating a control signal in response to the detection of the interfering vibration;
 a separate vibration damper module for integration in a motor vehicle and including a hollow-cylindrical housing which has opposite ends, and end closures constructed for transmitting a force and respectively secured to the ends of the housing for sealing the ends of the housing; and
 an actuator assembly secured to an inside wall surface of the housing of the vibration damper module and extending between the end closures, said actuator assembly rendered operative in response to the generation of the control signal for causing the vibration damper module to introduce into the motor vehicle a counter vibration to suppress the interfering vibration, wherein the actuator assembly includes at least three actuators distributed in the housing in spaced-apart relationship on a pitch circle and having a length extension aligned in parallel relationship to a length extension of the housing.

2. The apparatus of claim 1, wherein the actuators are each constructed in the form of a piezoelectric element.

3. The apparatus of claim 1, wherein the actuators are each constructed in the form of piezo ceramic stack actuator.

4. The apparatus of claim 1, wherein the vibration damper module has mounting flanges for securement of the vibration damper module between vehicle components.

5. The apparatus of claim 1, wherein the end closures are glued to the inside wall of the housing.

6. The apparatus of claim 1, wherein the end closures are welded to the inside wall of the housing.

7. The apparatus of claim 1, wherein the actuators are supplied with electric energy from an external power source via supply lines routed via the housing to the actuators.

8. A vibration damper module for installation in a vibration-producing component of a motor vehicle; comprising:
 a hollow-cylindrical housing having opposite ends;
 end closures respectively secured to the ends of the housing for sealing the ends of the housing; and
 an actuator assembly secured to an inside wall surface of the housing and extending between the end closures, said actuator assembly rendered operative in response to the generation of the control signal for imposing a force on the end closures of the housing to generate a vibration in opposition to an interfering vibration, wherein the actuator assembly includes at least three actuators distributed in the housing in spaced-apart relationship on a pitch circle and having a length extension aligned in parallel relationship to a length extension of the housing.

* * * * *